United States Patent Office 3,276,598
Patented Oct. 4, 1966

3,276,598
SUPPORTED DIALYSIS MEMBRANE
Alan S. Michaels, Lexington, Mass., and Richard G. Miekka, Albany, N.Y., assignors, by mesne assignments, to The Dow Chemical Company, Midland, Mich., a corporation of Delaware
No Drawing. Filed Oct. 24, 1961, Ser. No. 147,207
5 Claims. (Cl. 210—500)

This invention relates to novel solid polymeric films formed by coprecipitation of water soluble polyelectrolytes having dissociable ionic groups of opposite charge, and to methods of forming such films.

When sufficiently concentrated aqueous solutions of oppositely charged polyelectrolytes are brought into contact, it is frequently found that extremely thin (ca. 200 A.) uniform complex films form at the two solution interfaces due to ionic interaction between the polyelectrolytes. The films completely block further interaction between the polymers, making their own thickness self-limiting. Although various investigators have reported the existence of such films, no one, to our knowledge, has previously isolated the films from their polymer solution environments, or attempted investigation of their properties.

Because of their very high diffusivity toward simple electrolytes (NaCl), but very low diffusivity toward larger molecular or ionic species (e.g., methylene blue chloride), the films are useful as dialysis membranes. Their tendency, when dry, to adhere spontaneously to most solid surfaces suggests their use as ultra-thin coatings in a variety of commercial applications.

The polyelectrolytes useful in this invention are organic polymers having dissociable ionic groups which impart electrolytic characteristics in forming salts and acids (in the case of anionic polyelectrolytes) and bases (in the case of cationic polyelectrolytes). Typical of these are the polymers of sodium styrene sulfonate and of vinyl benzyl trimethyl ammonium chloride, and other materials of the same general type having a synthetic organic polymeric structure, which, without the ionic groups (sulfonate or quaternary ammonium), would be a water insoluble film forming material. They are accordingly characterized by a sufficiently high molecular weight to be solid and capable of film formation (typically greater than 50,000) while having sufficient dissociable ionic groups chemically bonded to the polymeric structure to be water soluble. As a very general rule there should be at least one ionic group for every six repeating monomer (mer) units, or for each average chain interval of 12 carbon atoms.

Thus, in addition to the preferred polymers of sodium styrene sulfonate and vinyl benzyl trimethyl ammonium chloride, copolymers of these materials with other vinyl compounds in molar ratios of 1:6 or less may be employed, as well as other well known polyelectrolytes of the same general type, such as polyacrylic acid, hydrolyzed copolymers of styrene and maleic anhydride, polyvinyl sulfonic acid, sulfonated polystyrene, polyethyleneimine, polyvinyl pyridine, and polydimethylaminoethyl methacrylate.

When solutions of oppositely charged polyelectrolytes are mixed together under proper conditions of concentration and temperature, the oppositely charged macroions coreact ionically and precipitate from solution. Because of their high charge density, polyelectrolytes have a much greater tendency to associate with each other than do their corresponding monomers.

We have now discovered novel methods for isolating these exceedingly thin interfacial complex polyelectrolyte films from their original polyelectrolyte environments. These methods are described below as applied to films formed between solutions of poly(vinylbenzyltrimethyl ammonium chloride), and poly(sodium styrene sulfonate) homopolymers. Such description, however, is not to be construed to restrict our invention to these polyelectrolytes, but merely to provide an example of the treatment methods and their attendant advantages and benefits. The inventive principles delineated below are general in concept, and construed to apply to all polyelectrolyte systems capable of forming thin complex interfacial films, and also to any and all mechanical systems of any composition or shape whatever which are used to contain or support the interfacial films during their formation and/or subsequent isolation from their original polyelectrolyte solution environments.

To practice our invention two separate solutions (usually aqueous, but not necessarily so), one containing an anionic polyelectrolyte (or polyelectrolytes), the other containing a cationic polyelectrolyte (or polyelectrolytes) are made up with concentrations adjusted such that the polyelectrolytes will react to form an interfacial film when the two solutions are brought into mutual contact. These concentrations may be readily determined by routine experimentation. The two polyelectrolyte solutions are contacted in one of the following manners to allow the formation of an interfacial film:

(a) A washer, screen, or other suitable porous object is dipped into or otherwise coated by one of the polyelectrolyte solutions so that a film of the solution is formed across the hole(s) in the object. This assemblage is then coated with the second polyelectrolyte solution in such a way that it comes into intimate contact with the first liquid coating across the holes in the object. The complex polyelectrolyte film which forms rapidly at the two-solution interface will be anchored peripherally to the supporting structure.

(b) Opposite sides of a porous membrane (filter paper, bacteriological filter membrane, etc.) are contacted more-or-less simultaneously with the solutions containing the oppositely-charged polyelectrolytes. Sufficient time is allowed for the solutions to diffuse together and react to form a complex film within, or at the surface of, the supporting membrane. If the film is to be formed within the supporting membrane structure, it is desirable to wet the membrane before contacting it with the polyelectrolyte solutions.

The complex film is next washed free of the excess polyelectrolyte solutions by water or other suitable solvents. If the complex film is supported only at infrequent intervals (e.g., when the supporting substrate is a coarse screen, ring, washer, etc.), great care must be taken to avoid breaking the delicate membrane during the wash process. We have successfully washed complex films formed across the holes in ⅝ inch I.D. plastic and metal rings by carefully dipping the rings into quiescent water and allowing the excess polymer solutions to be washed off by diffusion and by the natural convection currents in the wash liquid. These processes are aided by the fact that the excess polyelectrolyte solutions tend to slough off and drift to the bottom of the wash vessel since their densities are usually greater than that of the wash solution.

If desired the complex films are dried, transferred (wet or dry) to another suitable supporting object, or otherwise treated to prepare them for final usage. If the films are to be dried, it may be desirable to add a small amount of plasticizing agent (glycerin, dextrose, etc.) to the wash water to minimize film breakage due to shrinkage stresses developed during drying.

By way of illustration, complex films formed by interaction between poly(vinylbenzyltrimethyl ammonium chloride), VBTAC, a cationic polyelectrolyte having a molecular weight of about 300,000, and poly(sodium styrene sulfonate), NaSS, an ionic polyelectrolyte having a molecular weight of about 760,000, have been prepared and treated in the following ways:

Example 1

One side of a clean plexiglas ring, 3/4" O.D., 5/8" I.D., and approximately 1/16" thick was dipped into a 3 percent aqueous solution of NaSS in such a way that a film of the solution was formed across the hole in the ring. The ring was then turned over and dipped into a 3 percent aqueous VBTAC solution so that a film of the latter was formed in contact with the NaSS solution film. A coprecipitated polyelectrolyte membrane formed rapidly at the interface between the two liquid films. The ring was then suspended edgewise in a beaker of water for one hour to wash the excess unreacted VBTAC and NaSS solutions from the surfaces of the precipitated film. The plastic ring was then removed from the wash water and placed in a desiccator at 50 percent relative humidity to dry the film. The final dried film was transparent, but in reflected light resembled the "black" films formed by oil on water, indicating its extreme thinness. By careful manipulation, films formed in this manner could be successfully transferred, wet or dry, to supporting surfaces such as glass, or fine mesh metal screens. The dried films adhered tenaceously to any solid surface with which they came in contact.

Example 2

A piece of filter paper (S & S No. 576) was wetted with water and clamped vertically in a diffusion cell in such a way as to form a barrier between the two compartments of the cell. The diffusion rate of NaCl through the filter paper was determined conductimetrically to be 0.31 meq./hr./sq. in. for a 0.1 molar concentration gradient across the paper (0.1 M NaCl diffusing into 0.001 M NaCl). After being washed, the filter paper was contacted on one side by a 3 percent NaSS solution, and on the other side by a 3 percent VBTAC solution by pouring the solutions simultaneously into the two cell compartments. The heights of the two solutions were adjusted so that no hydraulic gradient existed across the filter paper. After sufficient time had been allowed for the polymer solutions to diffuse into the filter paper and react to form an interfacial film, the solutions were poured out, and the paper was thoroughly washed with distilled water to remove the excess polyelectrolyte solutions. The diffusion rate of 0.1 M NaCl through the treated paper was remeasured and again found to be 0.31 meq./hr./sq. in., indicating that the diffusional resistance of the interfacial membrane was negligible compared to that of the filter paper. In a test of the continuity of the imbedded interfacial film, it was found that less than 0.01 ml. of water flowed through the treated filter paper when a 3-inch hydraulic gradient was applied across it for 24 hours.

Although this invention has been described with reference to its preferred embodiments, it is contemplated that numerous modifications will readily occur to those skilled in the art and familiar with this disclosure, and that such modifications may be made without departing from the scope of the invention. In particular, it is obvious that polyelectrolytes other than those described, and at other concentrations may be employed. It has been found for instance that the NaSS and VBTAC employed in the examples may be in concentrations from at least 0.5 grams/100 cc. up to the limits of solubility.

Having thus disclosed our invention, we claim and desire to secure by Letters Patent:

1. A supported dialysis membrane consisting essentially of a foraminous supporting member and a continuous film about 200 A. in thickness thereon, said film being produced by the coprecipitation of a polycation and a polyanion at the interface between an aqueous solution of a homopolymer of vinylbenzyltrimethyl ammonium chloride and an aqueous solution of a homopolymer of sodium styrene sulfonate, said interface being defined by said foraminous supporting member.

2. A membrane as defined by claim 1 wherein each of said homopolymers has a molecular weight greater than 50,000.

3. A membrane as defined by claim 1 wherein each of said homopolymers has at least one dissociable group for every average chain length interval of 12 carbon atoms.

4. The method of making a supported dialysis membrane by interfacial reaction between an aqueous solution of a homopolymer of sodium styrene sulfonate and an aqueous solution of a homopolymer of vinylbenzyltrimethyl ammonium chloride comprising forming a continuous film of one of said solutions on a foraminous support member then contacting said film with the other of said solutions to produce an interface therebetween and coprecipitate said homopolymers and produce said membrane.

5. The method of making a supported dialysis membrane by interfacial reaction between an aqueous solution of a homopolymer of sodium styrene sulfonate and an aqueous solution of a homopolymer of vinylbenzyltrimethyl ammonium chloride comprising contacting one side of a porous support with one of said solutions and simultaneously contacting the other side of said support with the other of said solutions until sufficient of said solutions have diffused to an interface in said porous support and coprecipitated therein to produce said dialysis membrane.

References Cited by the Examiner

UNITED STATES PATENTS

| | | | |
|---|---|---|---|
| 2,832,746 | 4/1958 | Jackson | 260—17 XR |
| 2,832,747 | 4/1958 | Jackson | 260—17 XR |
| 2,955,067 | 10/1960 | McBurney. | |
| 2,961,417 | 11/1960 | Small | 260—45.4 X |
| 3,041,292 | 6/1962 | Hatch. | |

FOREIGN PATENTS

| | | |
|---|---|---|
| 728,508 | 4/1955 | Great Britain. |

OTHER REFERENCES

Frillette, "Preparation and Characterization of Bipolar Ion-Exchange Membranes," J. Phys. Chem. 60, pp. 435–6, (1956).

LEON D. ROSDOL, *Primary Examiner.*

JULIUS GREENWALD, *Examiner.*

K. W. VERNON, M. WEINBLATT, *Assistant Examiners.*